(12) United States Patent
Pinon Perez

(10) Patent No.: US 10,464,501 B2
(45) Date of Patent: Nov. 5, 2019

(54) FASTENER FOR ATTACHING A TRIM COMPONENT TO AN INNER STRUCTURE OF A VEHICLE

(71) Applicant: GM GLOBAL TECHNOLOGY OPERATIONS LLC, Detroit, MI (US)

(72) Inventor: Luis Armando Pinon Perez, Cuautitlán (MX)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/711,337

(22) Filed: Sep. 21, 2017

(65) Prior Publication Data

US 2019/0084499 A1    Mar. 21, 2019

(51) Int. Cl.
*B60R 13/02* (2006.01)
*F16B 5/06* (2006.01)

(52) U.S. Cl.
CPC ............ *B60R 13/0206* (2013.01); *F16B 5/06* (2013.01)

(58) Field of Classification Search
CPC ............................... B60R 13/0026; F16B 5/06
See application file for complete search history.

(56) References Cited

U.S. PATENT DOCUMENTS

| | | | | |
|---|---|---|---|---|
| 2,301,116 A | * | 11/1942 | Gusbeth | E05C 19/08 292/286 |
| 2,570,556 A | * | 10/1951 | Jacobi | E05B 83/30 292/127 |
| 3,181,904 A | * | 5/1965 | Fallarino | E05B 65/10 292/140 |
| 4,023,839 A | * | 5/1977 | Bisbing | E05C 3/30 292/85 |
| 5,158,329 A | * | 10/1992 | Schlack | E05C 19/06 292/87 |
| 5,628,534 A | * | 5/1997 | Morgan | E05C 1/10 292/101 |
| 6,135,510 A | * | 10/2000 | Diginosa | E05B 65/0876 292/145 |
| 6,895,790 B2 | * | 5/2005 | Jeffries | E05C 1/06 292/139 |
| 7,140,650 B2 | * | 11/2006 | Berg | E05C 19/06 292/67 |
| 8,844,992 B1 | * | 9/2014 | Noga | B60R 13/0206 24/289 |

(Continued)

*Primary Examiner* — Robert Sandy
*Assistant Examiner* — David M Upchurch

(57) ABSTRACT

A fastener for attaching a trim component to a vehicle inner structure includes first and second components. The first component, including a first body portion and a latch, is fixed to one of the trim component and the inner structure. The first body portion has a first aperture extending through first and second opposing surfaces. The latch has a fixed portion projecting from the first surface, and a movable portion pivotable relative to the fixed portion. The second component, including a second body portion and a retainer, is fixed to the other of the trim component and the inner structure. The second body portion has third and fourth opposing surfaces. The retainer projects from the third surface and defines a second aperture. The retainer is inserted into the first aperture. The movable portion pivots to be inserted into the second aperture to secure the trim component to the inner structure.

17 Claims, 6 Drawing Sheets

(56) References Cited

U.S. PATENT DOCUMENTS

2008/0179898 A1* 7/2008 Juga .......................... B60J 7/19
   292/254
2011/0025074 A1* 2/2011 Reznar ..................... E05B 5/00
   292/33

* cited by examiner

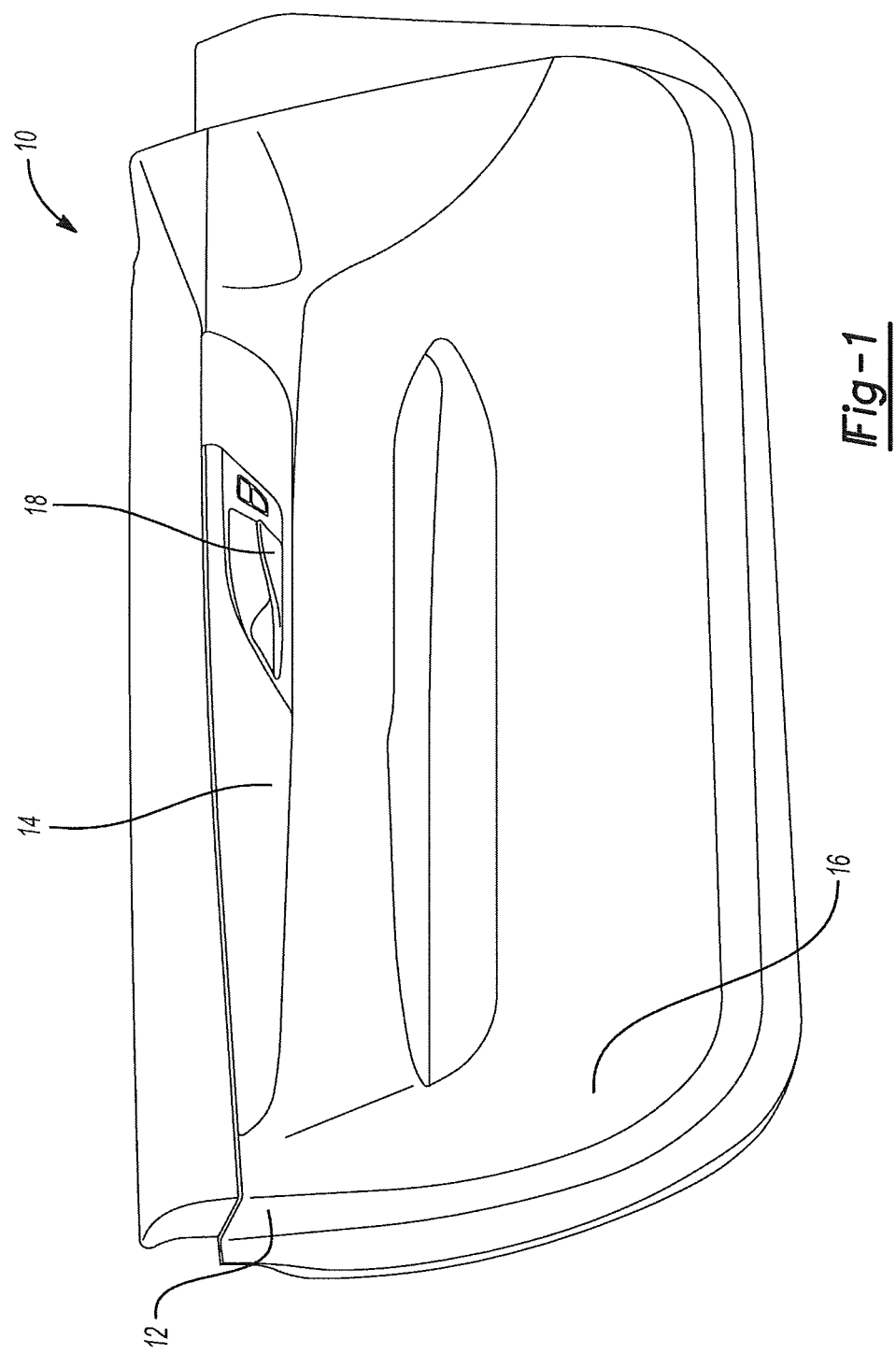

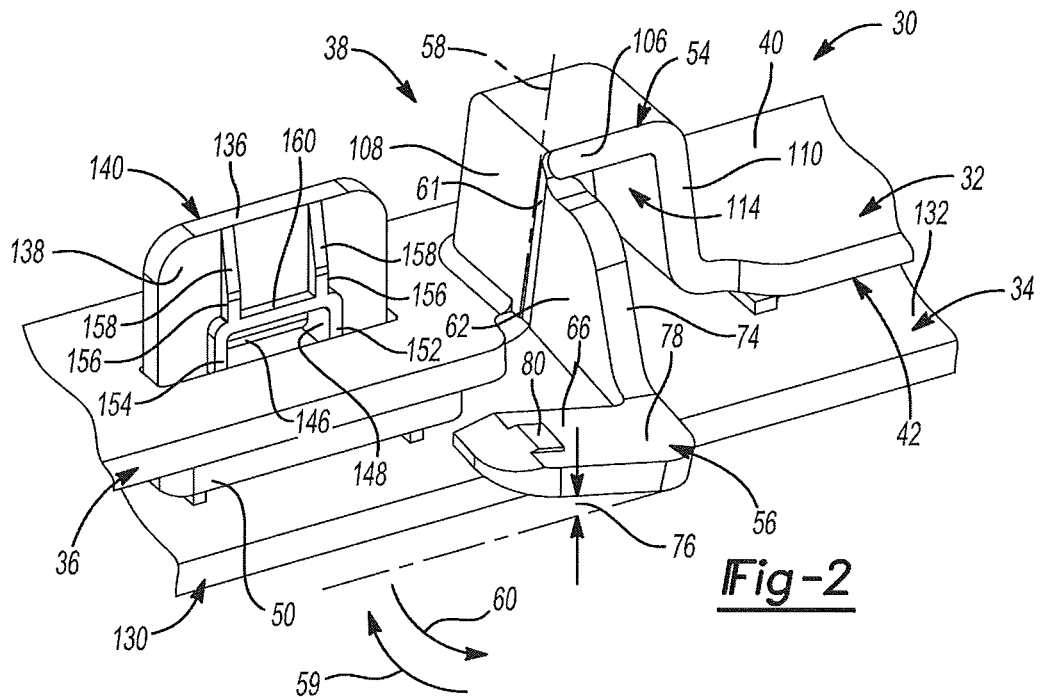

FASTENER FOR ATTACHING A TRIM COMPONENT TO AN INNER STRUCTURE OF A VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to fasteners for attaching a trim component to an inner structure of a vehicle.

Some vehicles include trim components that are fastened to an inner structure of the vehicle. The trim components are manufactured separately from the vehicle inner structures to which they are attached. Thus, the trim components must be securely attached to the inner structures so that they are not inadvertently removed or loosened during use of the vehicle.

SUMMARY

The present disclosure provides a fastener for attaching a trim component to an inner structure of a vehicle. The fastener includes a first component and a second component. The first component can be fixed to one of the trim component and the inner structure. The first component includes a first body portion and a latch. The first body portion has a first surface, a second surface opposite of the first surface, and a first aperture. The first aperture extends through the first and second surfaces. The latch includes a fixed portion and a movable portion. The fixed portion projects from the first surface of the first body portion. The movable portion is pivotable relative to the fixed portion about a pivot axis. The second component can be fixed to the other one of the trim component and the inner structure. The second component includes a second body portion and a retainer. The second body portion has a third surface and a fourth surface disposed opposite of the third surface. The retainer projects from the third surface and defines a second aperture. The retainer can be inserted into the first aperture. When the retainer is inserted into the first aperture, the movable portion of the latch can be pivoted about the pivot axis in a first direction and inserted into the second aperture in the retainer to secure the trim component to the inner structure.

In some configurations, the latch further includes a living hinge. The living hinge connects the fixed portion and the movable portion to one another while allowing the movable portion to pivot relative to the fixed portion about the pivot axis.

In some configurations, the movable portion of the latch includes a wall and a tab. The wall extends from the living hinge along a first longitudinal axis. The tab projects from the wall at a first angle relative to the first longitudinal axis. The tab extends through the second aperture in the retainer when the fastener is securing the trim component to the inner structure.

In some configurations, the first angle is greater than or equal to 75 degrees and less than or equal to 85 degrees.

In some configurations, the tab of the latch is oriented at a second angle relative to the first surface of the first component. The second angle is greater than zero when the tab is in a relaxed state.

In some configurations, the retainer has an inner peripheral surface that defines the second aperture. The inner peripheral surface engages the tab of the latch and deflects the tab toward the first surface of the first component when the tab is inserted into the second aperture. The second angle between the tab and the first surface has a first magnitude when the latch is in the relaxed state. The second angle between the tab and the first surface has a second magnitude when the tab is inserted into the second aperture. The second magnitude is less than the first magnitude.

In some configurations, the retainer has a fifth surface and a sixth surface opposite of the fifth surface. The second aperture extends through the fifth and sixth surfaces. The latch further includes a protrusion that projects from the tab and engages the sixth surface of the retainer when the tab is inserted into the second aperture in the retainer to inhibit movement of the movable portion of the latch in a second direction opposite of the first direction.

In some configurations, the first, second, third, fourth, fifth, and sixth surfaces are planar surfaces. The first and second apertures have elongated shapes.

In some configurations, the tab of the latch includes a proximal section and a distal section. The distal section leads the proximal section when the tab is inserted into the second aperture. A distal end of the distal section has a first ramped surface.

In some configurations, the protrusion projects from the proximal section of the tab. The protrusion has a second ramped surface. The second ramped surface of the protrusion is coplanar with the first ramped surface of the distal section.

In some configurations, the tab includes a second longitudinal axis and a bottom surface. The bottom surface is parallel to the first surface of the first body portion when the tab is inserted into the second aperture. The distal section includes a first width adjacent to the proximal section and a second width that less than the first width at the distal end of the distal section. The first and second widths of the distal section of the latch are parallel to the bottom surface and the second longitudinal axis.

In some configurations, the fixed portion of the latch projects from the first surface in a third direction. The protrusion projects from the tab in the third direction. The tab flexes in a fourth direction opposite of the third direction when the protrusion engages the second aperture in the retainer. The tab flexes in the third direction and the protrusion engages the sixth surface of the retainer after the protrusion is inserted past the second aperture.

In some configurations, the tab on the latch is removable from the second aperture in the retainer by moving the tab in the fourth direction to disengage the protrusion from the sixth surface of the retainer.

In some configurations, the retainer includes a rib projecting from the fifth surface of the retainer and disposed about a perimeter of the second aperture. An inner surface of the rib engages the tab of the latch when the tab is inserted into the second aperture.

In some configurations, the retainer further includes a gusset connecting the fifth surface and an outer peripheral surface of the rib. The gusset has a ramped surface that can engage the first aperture in the first component as the retainer is inserted into the first component.

In some configurations, the wall of the movable portion of the latch has a wall surface that faces the retainer when the tab of the movable portion is inserted into the second aperture in the second component. The tab of the movable portion has a tab surface that faces the fixed portion of the latch when the tab is inserted into the second aperture in the second component. The movable portion further includes an angle brace connecting wall surface and the tab surface to one another. The angle brace engages the retainer as the tab is inserted into the second aperture to prevent the movable portion from moving in the first direction beyond a first position.

In some configurations, the fixed portion of the latch includes a wall that forms an angle with the first surface. The angle is greater than or equal to 95 degrees and less than or equal to 99 degrees.

In some configurations, the first component includes a rib projecting from the second surface of the first component. The rib is disposed about the first aperture in the first component. The rib engages the third surface of the second component when the retainer is inserted into the first aperture in the first component.

In some configurations, a door assembly includes the fastener, the inner structure, and the trim component. The first component is fixed to a door structure of the door assembly. The second component is fixed to the trim component.

In some configurations, the first component is integrally formed with the door structure. The second component is integrally formed with the trim component.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 is a perspective view of a door assembly of a vehicle including a door inner structure and a trim component;

FIG. 2 is a perspective view of a fastener of the door assembly of FIG. 1 including a first component and a second component according to the present disclosure, with the fastener in an unlocked configuration;

FIGS. 3A-3B are perspective views of the fastener of FIG. 2, with the fastener in a locked configuration;

In the drawings, reference numbers may be reused to identify similar and/or identical elements.

DETAILED DESCRIPTION

Figure 3B:
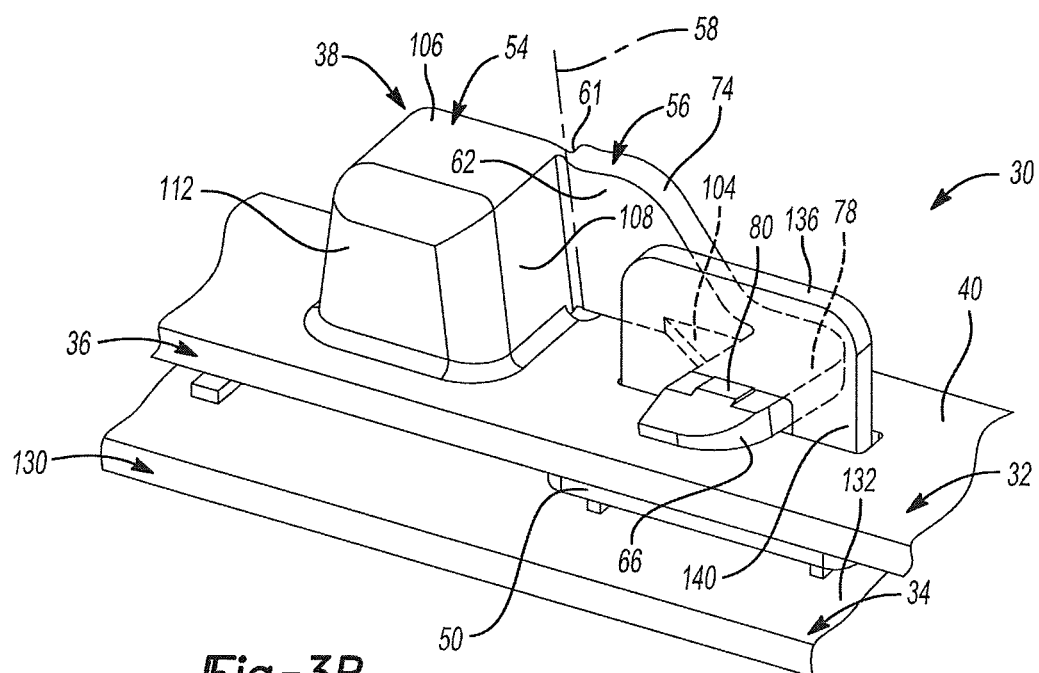

As discussed above, some vehicles include trim components. The trim components are fixed to an inner structure of the vehicle. For example, the trim components may be fixed to a door inner structure, an electronics panel, a storage compartment, or a seat back. Trim components can become loosened during use of the vehicle, which may result in the trim component separating from the inner structure.

One method of fastening the trim component to the inner structure is by inserting a screw through the trim component and the inner structure. For example, when the inner structure is a door inner structure, the screw is inserted through the door inner structure and then through the trim assembly so that a head of the screw engages the door inner structure and threads of the screw engage the trim component. Although the screw provides sufficient retention between the trim component and the inner structure, it increases the complexity of the assembly and adds to the cost of the assembly.

Another method of fastening the trim component to the inner structure is by heat staking. For example, the trim component includes a boss and the door inner structure includes a hole. The boss is sized for a slip fit in the hole. After the boss is inserted into the hole, the boss is heated so that it expands radially and yields an interference fit within the hole. After heat staking, the boss includes a stem extending through the hole and a head disposed outside of the hole. Unlike the use of a screw, the fastener formed by heat staking includes only two components: the trim component and the inner structure. However, relative to a screw, the heat staked fastener may provide a lower retention strength during use of the vehicle. Thus, the trim assembly may loosen or become completely separated from the inner structure during use of the vehicle.

The present disclosure relates to a fastener for attaching a trim component to an inner structure of a vehicle. The fastener includes only a first component and a second component, which can be integrally formed with the trim component and the inner structure, respectively. Thus, the door assembly is free of additional fastening components, and therefore the fastener is desirably less complex when compared a screw fastener.

In one example, the first and second components of the fastener are integrally formed with a trim component and a door inner structure. The door inner structure includes a sidewall defining an opening (i.e., first aperture) into which a tab (i.e., retainer) on the trim component is inserted. The tab projects from a back side of the trim component and, when the tab is inserted into the opening in the sidewall of the door inner structure, the tab extends in a cross-car direction toward the exterior of the vehicle. The inner structure further includes a latch structure projecting from a backside of the sidewall toward the exterior of the vehicle in the cross-car direction. The latch structure includes a hinged latch or hook that is pivoted upward or downward and snapped into a hole (i.e., second aperture) in the tab of the trim component to secure the tab of the trim component in the opening in the sidewall. The hook includes a ramped protrusion that is inserted completely through the hole in the tab and engages the backside of the tab to retain the hook in the hole in the tab.

The geometry of the fastener improves the retention strength of the fastener as compared to a heat staked fastener. Compared to a heat staked fastener, the fastener according to the present disclosure has more contact area between components, has an attachment at two distinct locations, and has an increased cross-sectional area, all of which enable a better retention between the components. As a result of the two distinct attachment points, the fastener would need to be sheared in two directions to separate the trim component from the inner structure. More specifically, the hook would need to be sheared in a cross-car direction and the tab would need to be sheared in a vertical direction.

The retention is further improved because the hook and the tab have a larger cross-sectional area than the head of a heat staked fastener. This geometry is particularly useful in situations when an impact force is applied to the inner structure or the trim component, such as when a passenger leans on the door. The retention strength can be further improved by selection of a material with a high shear modulus.

Referring to FIG. 1, a door assembly 10 for a vehicle according to certain aspects of the present disclosure includes an inner structure 12 and a trim component 14. The inner structure 12 includes an inside surface 16 that faces an interior of the vehicle. The door assembly 10 also includes a lever 18 that an occupant can use to open the door assembly 10.

With reference to FIGS. 2-5C, a fastener 30 for attaching the trim component 14 to the inner structure 12 of the vehicle according to certain aspects of the present disclosure includes a first component 32 and a second component 34. The first component 32 is fixed to the door inner structure 12 and the second component 34 is fixed to the trim component 14. In various implementations, the first component 32 may be fixed to the trim component 14 and the second component 34 may be fixed to the door inner structure 12. In various implementations, the first and second components 32, 34 are integrally formed with the door inner structure 12 and the trim component 14, respectively.

Figure 3C:
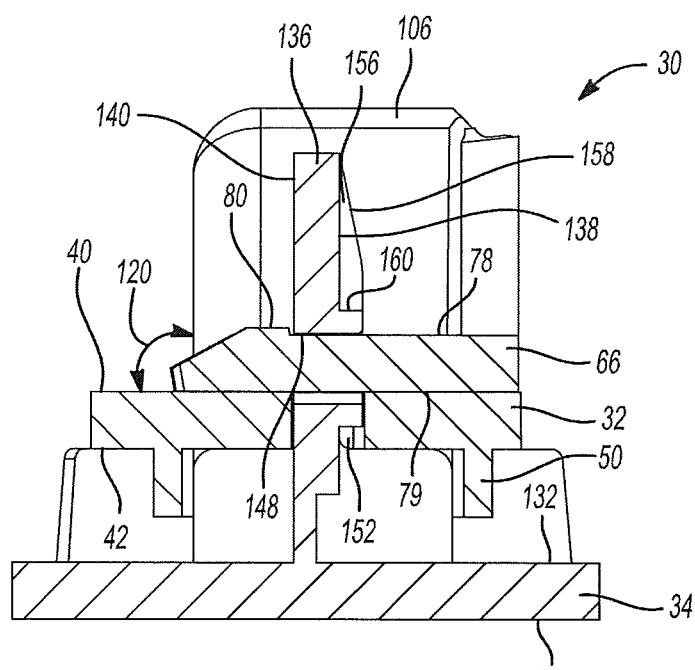
FIG. 3C is a cross-sectional view of the fastener of FIGS. 3A-3B taken at line 3C-3C of FIG. 3A.

The fastener 30 is operable to move between an unlocked configuration (FIG. 2) and a locked configuration (FIGS. 3A-3C). In the unlocked configuration, the second component 34 is separable from the first component 32. In the locked configuration, the second component 34 is fixed to the first component 32. An operator places the fastener 30 in the locked configuration to install the trim component 14 onto the vehicle inner structure 12. The operator can subsequently remove the trim component 14 from the inner structure 12 by moving the fastener 30 into the unlocked condition. The trim component 14 can be removed by hand (i.e., without using a tool) for repair, replacement, or to perform maintenance on the door assembly 10 (FIG. 1).

The first component 32 includes a first body portion 36 and a latch 38. The first body portion 36 includes a first surface 40 and a second surface 42 that is opposite the first surface 40. The first surface 40 is disposed toward an exterior of the vehicle and the second surface 42 is disposed toward an interior of the vehicle when the fastener 30 is in the locked configuration. Although the first and second surfaces 40, 42 are shown as planar, they may be contoured as required by a design of the door inner structure 12. In various implementations, the first surface 40 is parallel to the second surface 42 as shown.

Figure 5A:
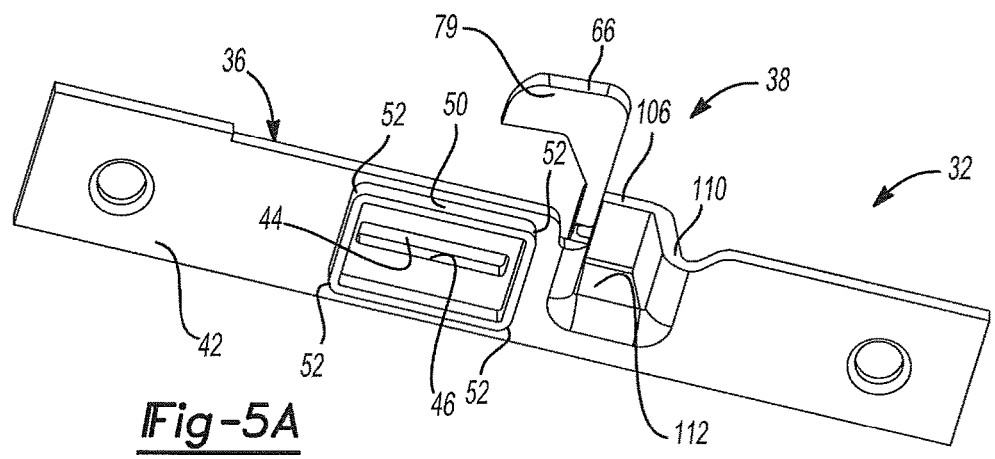
FIG. 5A is a perspective view of a front of the first component of the fastener of FIG. 2.
Figure 5B:
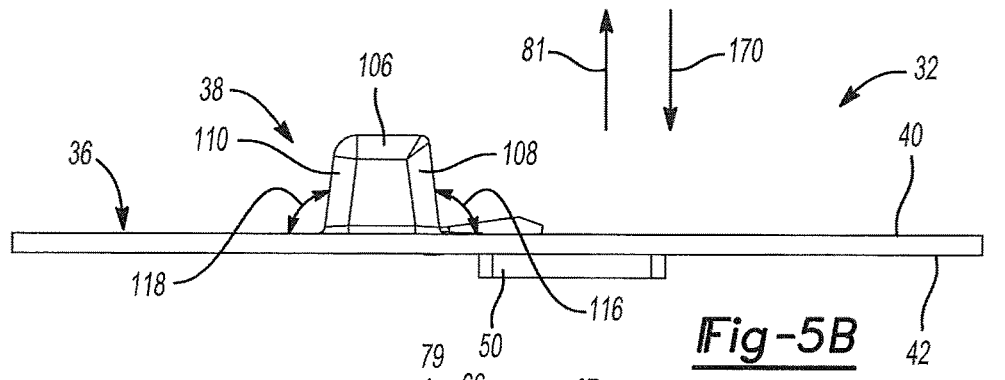
FIG. 5B is a top view of the first component of FIG. 5A.
Figure 5C:
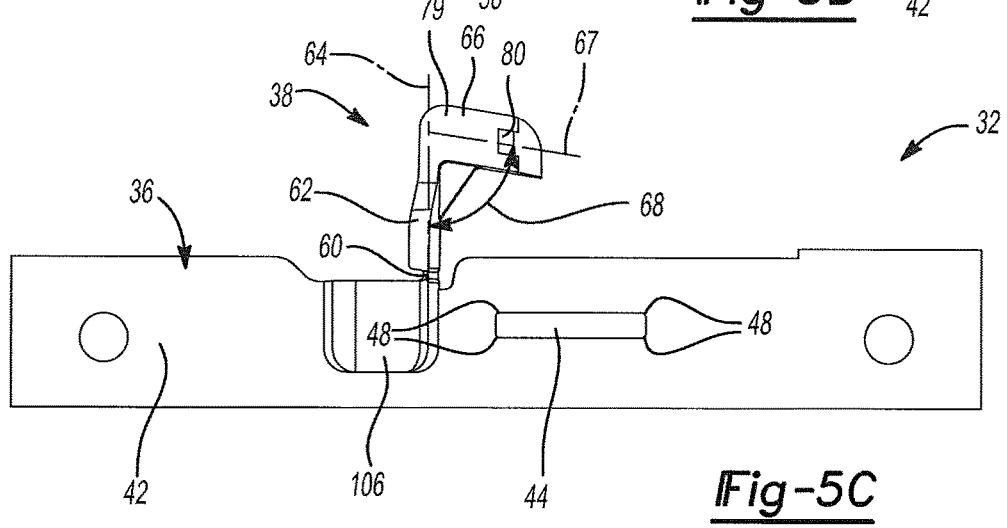
FIG. 5C is a back view of the first component of FIG. 5A.

A first aperture 44 extends through the first surface 40 and the second surface 42 (FIG. 5A). The first aperture 44 is defined by a first inner peripheral surface 46. The first aperture 44 has an elongated shape and has a generally rectangular cross-section with rounded corners 48 (FIG. 5C). In various implementations, the first aperture may have other shapes, such as a slot with rounded ends.

Figure 4:
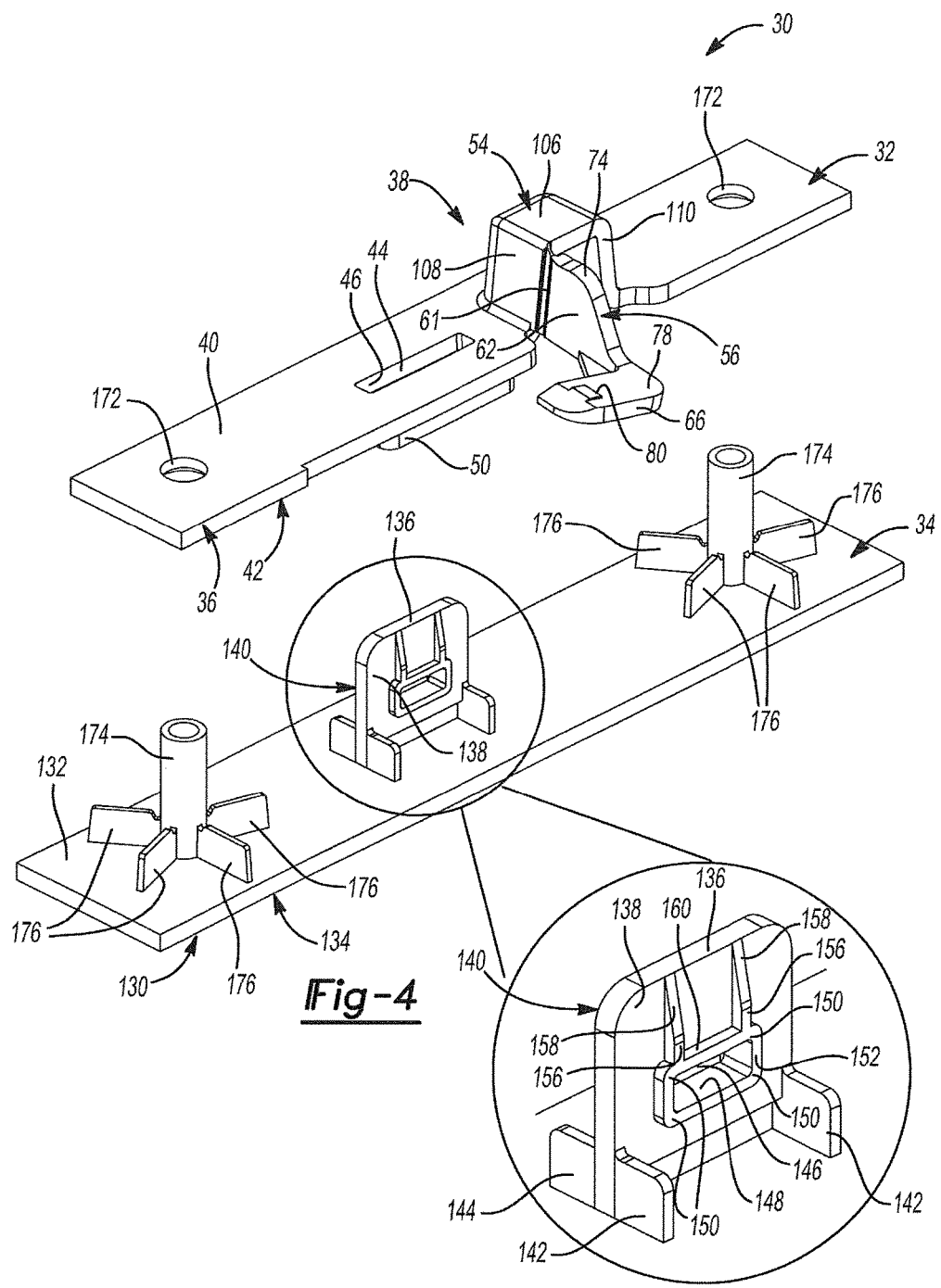
FIG. 4 is an exploded perspective view of the fastener of FIG. 2.

The first component 32 includes a first rib 50 projecting from the second surface 42 (FIG. 4). The first rib 50 is disposed about the first aperture 44. The first rib 50 completely surrounds the first aperture 44 and has a generally rectangular shape with rounded corners 52 (FIG. 5A). In various implementations, the first rib 50 may have other geometries. As non-limiting examples, the first rib 50 can include a plurality of lateral walls, a plurality of longitudinal walls, an I-shaped cross section, and/or a T-shaped cross section.

The latch 38 includes a fixed portion 54 and a movable portion 56. The fixed portion 54 projects from the first surface 40 of the first body portion 36. The movable portion 56 is pivotable relative to the fixed portion 54 about a pivot axis 58 (FIGS. 2-3B). More specifically, the movable portion 56 is operable to pivot in a first direction 59 away from the fixed portion 54 and a second direction 60 opposite the first direction 59 toward the fixed portion 54 (FIG. 2).

The latch 38 includes a living hinge 61 disposed between and connecting the fixed portion 54 and the movable portion 56. The living hinge 61 enables the movable portion 56 to pivot relative to the fixed portion 54 about the pivot axis 58. In various implementations, the living hinge 61 may be replaced with an alternative joint, such as a separate pin that extends through the fixed portion 54 and the movable portion 56.

The movable portion 56 of the latch 38 includes a wall 62 that extends from the living hinge 61 along a first longitudinal axis 64 (FIG. 5C), and a tab 66 having a second longitudinal axis 67 (FIG. 5C). The tab 66 projects from the wall 62 at a first angle 68 relative to the first longitudinal axis 64 (FIG. 5C). More specifically, the first longitudinal axis 64 and the second longitudinal axis 67 define the first angle 68. The first angle 68 is greater than or equal to 70 degrees and less than or equal to 90 degrees, optionally greater than or equal to 75 degrees and less than or equal to 85 degrees, optionally 80 degrees.

The wall 62 has a first height 70 adjacent to the living hinge 61 and a second height 72 adjacent to the tab 66 (FIG. 3A). The first and second heights 70, 72 are perpendicular to the first surface 40 of the first body portion 36. The second height 72 is less than the first height 70. The wall 62 includes a first top surface 74 that extends between the living hinge 61 and the tab 66. The first top surface 74 is curved between the living hinge 61 and the tab 66. A slope of the curve increases in the direction of the first longitudinal axis 64 (FIG. 5C) such that the slope has a smaller magnitude adjacent to the living hinge 61 than the tab 66.

The tab 66 is oriented at a second angle 76 relative to the first surface 40 of the first body portion 36 (FIG. 2). The tab 66 is flexible with respect to the wall 62 in a direction parallel to the pivot axis 58 such that a force can be applied to tab 66 to affect the second angle 76. Absent an applied force, the tab 66 is in a relaxed state as shown in FIG. 2. In the relaxed state, the second angle 76 has a first value. The first value is greater than zero, optionally greater than or equal to 5 degrees and less than or equal to 25 degrees, optionally greater than or equal to 10 degrees and less than or equal to 20 degrees, optionally 15 degrees.

Figure 5D:
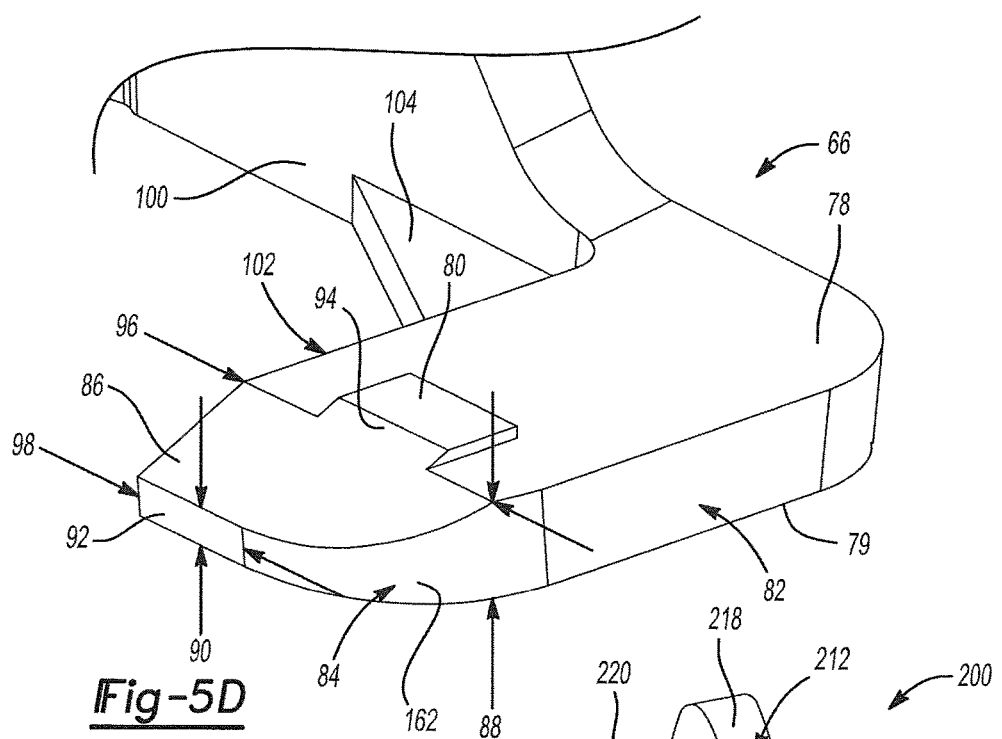
FIG. 5D is a perspective view of a tab of the first component of FIG. 5A.

With reference to FIG. 5D, the tab 66 has a second top surface 78 and a bottom surface 79 that are disposed at the second angle 76 with respect to the first surface 40 of the first body portion 36. A protrusion 80 projects from the second top surface 78 in a third direction 81 (FIG. 5B). The tab 66 includes a proximal section 82 disposed adjacent to the wall 62 and a distal section 84. The protrusion 80 is disposed in the proximal section 82 adjacent to the distal section 84.

The distal section 84 includes a first ramped surface 86 such that the distal section 84 has a first height 88 adjacent to the proximal section 82 and a second height 90 at a distal end 92. The first height 88 is greater than the section height 90. The first and second heights 88, 90 are perpendicular to the second top surface 78. The protrusion 80 includes a second ramped surface 94 that is coplanar with the first ramped surface 86 of the distal section 84.

The distal section 84 has a first width 96 adjacent to the proximal section 82 and a second width 98 at the distal end 92. The first width 96 is greater than the second width 98. The first and second widths 96, 98 are parallel to the second top surface 78 and perpendicular to the second longitudinal axis 67.

The wall 62 includes a wall surface 100 that extends in a direction perpendicular to the first surface 40 of the first body portion 36 and parallel to the first longitudinal axis 64. The tab 66 includes a tab surface 102 that is perpendicular to the second top surface 78 of the tab 66 and parallel to the second longitudinal axis 67 (FIG. 5C) of the tab 66. The wall surface 100 faces the tab surface 102. The movable portion 56 of the latch 38 includes an angle brace 104 that connects the wall surface 100 and the tab surface 102. The angle brace 104 limits motion of the tab 66 with respect to the wall 62 to maintain the first angle 68 within a predetermined range (or to limit the amount of change in the first angle 68).

Returning to FIGS. 2-5C, the fixed portion 54 of the latch 38 projects from the first surface 40 of the first body portion 36 in the third direction 81 (FIG. 5B). The fixed portion 54 includes a distal wall 106 that is parallel to the first surface 40. The fixed portion 54 further includes a first side wall 108, a second side wall 110 opposite the first side wall 108, a third side wall 112 extending between the first and second side walls 108, 110, and an open end 114 opposite the third side wall 112. Each of the first, second, and third side walls 108, 110, 112 extends between the first body portion 36 and the distal wall 106. The living hinge 61 is disposed adjacent to the first side wall 108.

The first side wall 108 is disposed at a third angle 116 (FIG. 5B) with respect to the first surface 40. The second wall 110 is disposed at a fourth angle 118 (FIG. 4) with respect to the first surface 40. The third side wall 112 is disposed at a fifth angle 120 (FIG. 3C) with respect to the first surface. Each of the third, fourth, and fifth angles 116, 118, 120 has a value that is greater than or equal to 90 degrees and less than or equal to 100 degrees, optionally greater than or equal to 95 degrees and less than or equal to 99 degrees, optionally 97 degrees.

The third, fourth, and fifth angles 116, 118, 120 may be selected so that the first, second, and third side walls 108, 110, 112 are disposed at angles greater than zero degrees from a direction of die draw when the first component 32 is manufactured in an injection molding process (i.e., the third, fourth, and fifth angles 116, 118, 120 are draft angles). In one example, the first and second walls 108, 110, are disposed 7 degrees from the direction of die draw and the third side wall 112 is disposed zero degrees from the direction of die draw. Thus, the third and fourth angles 116, 118 are each 97 degrees and the fifth angle 120 is 90 degrees. In various implementations, for example when the first component 32 is formed in a process other than injection molding, the third, fourth, and fifth angles 116, 118, 120 may each be about 90 degrees.

With reference to FIGS. 2-4, the second component 34 includes a second body portion 130 having a third surface 132 and a fourth surface 134 that is opposite the third surface 132. The third surface 132 is disposed toward the exterior of the vehicle and the fourth surface 134 is disposed toward the interior of the vehicle when the fastener 30 is in the assembled state. Although the third and fourth surfaces 132, 134 are shown as planar, they may be contoured as required by the trim component 14. In various implementations, the third surface 132 is parallel to the fourth surface 134 as shown.

The second component 34 further includes a retainer 136 projecting from the third surface 132. The retainer 136 is disposed perpendicular to the third surface 132. The retainer 136 includes a fifth surface 138 and a sixth surface 140 opposite the fifth surface 138. The fifth and sixth surfaces 138, 140 are planar and are parallel to one another. In various implementations, the fifth and sixth surfaces 138, 140 may have other geometries and/or orientations.

The second component 34 further includes first supports 142 and second supports 144 (FIG. 4). The first supports 142 connect the fifth surface 138 of the retainer 136 to the third surface 132 of the second body portion 130. The second supports 144 connect the sixth surface 140 of the retainer 136 to the third surface 132 of the second body portion 130. The first and second supports 142, 144 are disposed perpendicular to the second body portion 130 and the retainer 136.

The retainer 136 defines a second aperture 146 that extends through the fifth surface 138 and the sixth surface 140. The second aperture 146 is defined by a second inner peripheral surface 148. The second aperture 146 has an elongated shape and a generally rectangular cross-section with rounded corners 150 (FIG. 4).

The retainer 136 includes a second rib 152 projecting from the fifth surface 138 of the retainer 136. The second rib 152 is disposed about a perimeter 154 (FIG. 2) of the second aperture 146. In various implementations, the second rib 152 may have other geometries, such as one or more walls. The retainer 136 further includes gussets 156 having a third ramped surface 158. The gussets 156 connect an outer peripheral surface 160 of the second rib 152 to the fifth surface 138. In various implementations, the retainer 136 may include a single gusset 156 or more than two gussets 156.

The first and second components 32, 34 can be assembled together to place the fastener 30 in the locked configuration. The first and second components 32, 34 can be disassembled to place the fastener 30 in the unlocked configuration. The first and second components 32, 34 are in the locked configuration when the trim component 14 is attached to the door inner structure 12 (FIG. 1).

To assemble the first and second components 32, 34 to each other, the operator inserts the retainer 136 of the second component 34 into the first aperture 44 of the first component 32. The gussets 156 facilitate proper positioning of the second component 34 with respect to the first component 32. More specifically, the third ramped surfaces 158 of the gussets 156 may engage the first inner peripheral surface 46 of the first aperture 44 as the retainer 136 is inserted into the first aperture 44.

When the retainer 136 is fully inserted into the first aperture 44, the first rib 50 engages one or both of the third surface 132 of the second component and the supports 142, 144. The second surface 42 of the first component 32 faces the third surface 132 of the second component 34. The retainer 136 may engage the first inner peripheral surface 46 of the first aperture 44.

As discussed above, the movable portion 56 of the latch 38 is operable to pivot about the pivot axis 58 in the first direction 59 (FIG. 2) toward the second aperture 146 of the retainer 136 or in the second direction 60 (FIG. 2) opposite the first direction 59 away from the second aperture 146. To assemble the first and second components 32, 34 to each other, the operator pivots the movable portion 56 in the first direction 59 toward the second aperture 146. The distal section 84 of the tab 66 leads the proximal section 82 of the tab 66 as the tab 66 is inserted into the second aperture 146. The first ramped surface 86 and a taper 162 between the first and second widths 96, 98 facilitate insertion of the tab 66 into the second aperture 146.

When the first angle 68 (FIG. 5C) has a magnitude of less than 90 degrees, the movable portion 56 of the latch 38 does not need to travel as far about the pivot axis 58 to engage the tab 66 with the second aperture 146 compared to when the first angle 68 is 90 degrees. Furthermore, because the tab 66 enters the second aperture 146 at the first angle, a dimension of the tab 66 along a length of the second aperture 146 is greater than the first width 96. Thus, the contact area between the tab 66 and the second inner peripheral surface 148 is greater when the first angle 68 is less than 90 degrees compared to when the first angle is 90 degrees.

As the tab 66 is inserted into the second aperture 146, the protrusion 80 on the tab 66 engages the second inner peripheral surface 148. The engagement with the protrusion 80 forces the tab 66 to flex in a fourth direction 170 (FIG. 5B) opposite the third direction 81. When the protrusion 80 is inserted through the second aperture 146, the protrusion 80 disengages from the second inner peripheral surface 148 and the tab 66 flexes in the third direction 81. After the protrusion 80 has cleared the second aperture 146, it engages the sixth surface 140 of the retainer 136.

As discussed above, the second angle 76 has a first value in the relaxed state. The second angle 76 has a second value when the tab 66 is inserted into the second aperture 146. The second value is less than the first value. In various implementations, the second value is zero degrees.

In the locked configuration (FIGS. 3A-3C), the tab 66 engages the second inner peripheral surface 148 and the second rib 152. The tab 66 may contact only a portion of the second inner peripheral surface 148. In various implementations, the tab 66 may occupy the entire second aperture 146 so that it engages the entire second inner peripheral surface 148. The protrusion 80 engages the sixth surface 140 of the retainer 136 to prevent the movable portion 56 from pivoting in the second direction 60 out of a first position (shown in FIG. 3B). The angle brace 104 of the movable portion 56 engages the retainer 136 to prevent the movable portion 56 from pivoting in the first direction 59 past the first position.

As best shown in FIG. 3C, the bottom surface 79 of the tab 66 may engage the first surface 40 of the first body portion 36. The tab 66 engages the second inner peripheral surface 148 of the second aperture 146, the second rib 152, and the angle brace 104. The protrusion 80 engages the sixth surface 140 of the retainer 136. The high surface contact area of the components increases the retention between components. Furthermore the shear strength of the materials provides a strong resistance to impact forces, such as forces applied to the trim component 14 from the inside of the vehicle or to the inner structure 12 from the exterior of the vehicle.

As best shown in FIG. 4, the fastener 30 may include additional components to improve alignment of the first component 32 and the second component 34 during assembly. More specifically, the first component 32 may include a plurality of holes 172 in the first body portion 36. The second component 34 may include a respective plurality of rods 174 (or other protrusions) that are inserted through the holes 172 during assembly. Each rod 174 may include a plurality of circumferentially-disposed spacers 176. The spacers 176 engage the first component 32 when the fastener 30 is in the locked configuration.

The second component 34 is removable from the first component 32 by hand (i.e., without using a tool). For example, an operator may remove the second component 34 from the first component 32 to repair or replace the trim component 14 or to perform maintenance on the door assembly 10. When the tab 66 only partially engages the second inner peripheral surface 148, the operator move the tab 66 in the fourth direction 170 to disengage the protrusion 80 from the sixth surface 140 of the retainer 136. When the protrusion 80 is disengaged from the retainer 136, the movable portion 56 is pivotable in the second direction 60 to remove the tab 66 from the second aperture 146. When the tab 66 is completely removed from the second aperture 146, the operator moves the first component 32 in the third direction 81 to remove the retainer 136 from the first aperture 44.

In various implementations, where the tab 66 occupies the entire second aperture 146, the operator compresses the protrusion 80 to disengage it from the sixth surface 140 of the retainer 136. The protrusion 80 can be compressed, for example, by wedging a tool such as a flathead screwdriver into the second aperture 146 adjacent to the protrusion 80, and applying a torque in the direction of the protrusion 80. Once the protrusion 80 is disengaged from the sixth surface 140, the movable portion 56 is free to pivot in the second direction 60 and disassembly continues in the same manner as discussed above.

Figure 6:
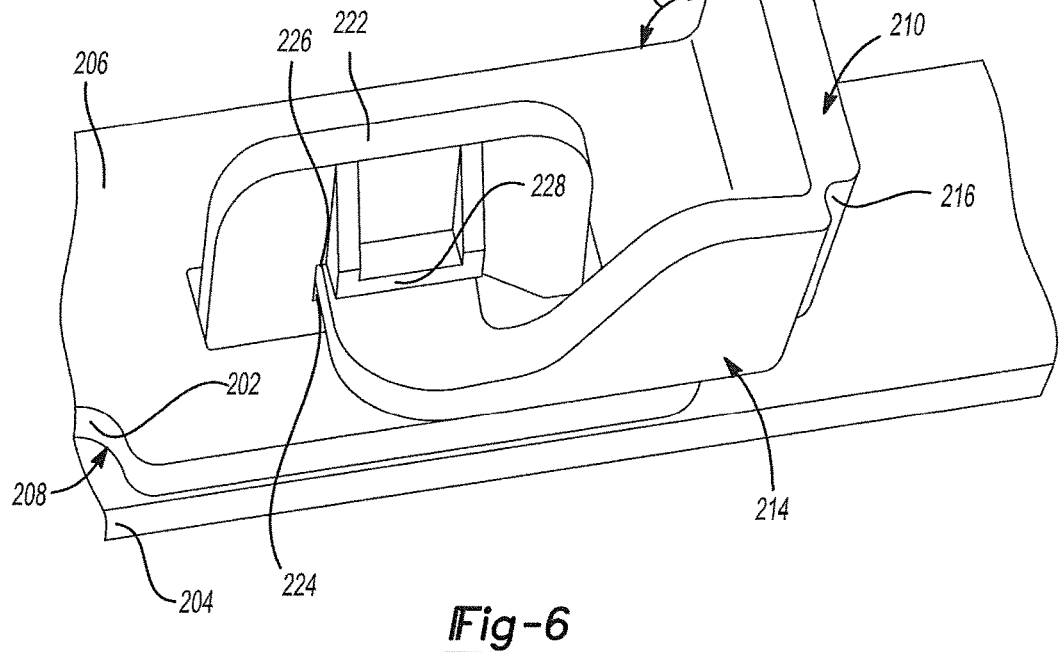
FIG. 6 is a perspective view of another fastener according to the present disclosure, with the fastener in a locked configuration.

Referring to FIG. 6, another fastener 200 for attaching the trim component 14 to the inner structure 12 of the vehicle according to certain aspects of the present disclosure includes a first component 202 and a second component 204. Similar to the fastener 30 of FIGS. 2-5C, the fastener 200 is operable to move between a locked configuration and an unlocked configuration. The first component 202 is fixed to one of the trim component 14 and the door inner structure 12. The second component 204 is fixed to the other one of the trim component 14 and the door inner structure 12. In various aspects, the first component 202 is fixed to the door inner structure 12 and the second component 204 is fixed to the trim component 14. In various implementations, the first component 202 is integrally formed with the door inner structure 12, and the second component 204 is integrally formed with the trim component 14.

The first component 202 includes a first surface 206 and a second surface 208 similar to the first surface 40 and the second surface 42 of the fastener 30 of FIGS. 2-5D. The first component 202 further includes a latch 210 having a fixed portion 212, a movable portion 214, and a living hinge 216 disposed between the fixed portion 212 and the movable portion 214. The movable portion 214 and the living hinge 216 may be similar to the movable portion 56 and the living hinge 61 of the fastener 30 of FIGS. 2-5D.

The fixed portion 212 differs from the fixed portion 54 of the fastener 30 in that it includes a single wall 218. The wall 218 is disposed at an angle 220 with respect to the first surface 206. The angle 220 may be selected to be greater than 90 degrees and less than or equal to 100 degrees, optionally greater than or equal to 95 degrees and less than or equal to 99 degrees, optionally 97 degrees.

Thus, the angle 220 may be selected so that the wall 218 is disposed at an angle greater than zero degrees from a direction of die draw when the first component 202 is manufactured in an injection molding process. In one example, the wall 118 is disposed seven degrees from the direction of die draw.

The second component 204 includes a retainer 222 and an aperture 224 similar to the retainer 136 and the second aperture 146 of the fastener 30. The aperture 224 includes a top edge 226. A rib 228 extends from the retainer 222 adjacent to the top edge 226 of the aperture 224. Thus, unlike the second rib 152 of the fastener 30, the rib 228 does not extend around an entire perimeter of the aperture 224.

Although the fasteners 30, 200 are shown on vehicle door assemblies 10, alternative locations and uses are contemplated. For example, the fasteners 30, 200 may be used to fasten an electronics trim component to an electronics inner structure. The fasteners 30, 200 may also be used for non-automotive vehicle applications, such as in airplanes, boats, and tractors. The fasteners 30, 200 may also be useful in any other non-vehicle applications where two components are fixed to one another. For example, the fasteners 30, 200 can be used to fix a trim embellishment to a piece of furniture or a structure.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A fastener for attaching a trim component to an inner structure of a vehicle, the fastener comprising:
    a first component configured to be fixed to one of the trim component and the inner structure, the first component including a first body portion and a latch, the first body portion having a first surface, a second surface opposite of the first surface, and a first aperture that extends through the first and second surfaces, the latch including a fixed portion and a movable portion, the fixed portion projecting from the first surface of the first body portion, the movable portion being pivotable relative to the fixed portion about a pivot axis; and
    a second component configured to be fixed to the other one of the trim component and the inner structure, the second component including a second body portion and a retainer, the second body portion having a third surface and a fourth surface disposed opposite of the third surface, the retainer projecting from the third surface and defining a second aperture, wherein the retainer is configured to be inserted into the first aperture and, when the retainer is inserted into the first aperture, the movable portion of the latch is configured to be pivoted about the pivot axis in a first direction and inserted into the second aperture in the retainer to secure the trim component to the inner structure, wherein the latch further includes a living hinge connecting the fixed portion and the movable portion to one another while allowing the movable portion to pivot relative to the fixed portion about the pivot axis.

2. The fastener of claim 1 wherein the movable portion of the latch includes a wall that extends from the living hinge along a first longitudinal axis and a tab that projects from the wall at a first angle relative to the first longitudinal axis, the tab extending through the second aperture in the retainer when the fastener is securing the trim component to the inner structure.

3. The fastener of claim 2 wherein the first angle is greater than or equal to 75 degrees and less than or equal to 85 degrees.

4. The fastener of claim 2 wherein:
    the tab of the latch is oriented at a second angle relative to the first surface of the first component; and
    the second angle is greater than zero when the tab is in a relaxed state.

5. The fastener of claim 4 wherein:
    the retainer has an inner peripheral surface that defines the second aperture, the inner peripheral surface engaging the tab of the latch and deflecting the tab toward the first surface of the first component when the tab is inserted into the second aperture;
    the second angle between the tab and the first surface has a first magnitude when the latch is in the relaxed state;
    the second angle between the tab and the first surface has a second magnitude when the tab is inserted into the second aperture; and
    the second magnitude is less than the first magnitude.

6. The fastener of claim 2 wherein:
the retainer has a fifth surface and a sixth surface opposite of the fifth surface;
the second aperture extends through the fifth and sixth surfaces; and
the latch further includes a protrusion that projects from the tab and engages the sixth surface of the retainer when the tab is inserted into the second aperture in the retainer to inhibit movement of the movable portion of the latch in a second direction opposite of the first direction.

7. The fastener of claim 6 wherein:
the first, second, third, fourth, fifth, and sixth surfaces are planar surfaces; and
the first and second apertures have elongated shapes.

8. The fastener of claim 6 wherein the tab of the latch includes a proximal section and a distal section, the distal section leading the proximal section when the tab is inserted into the second aperture, a distal end of the distal section having a first ramped surface.

9. The fastener of claim 8 wherein:
the protrusion projects from the proximal section of the tab;
the protrusion has a second ramped surface; and
the second ramped surface of the protrusion is coplanar with the first ramped surface of the distal section.

10. The fastener of claim 8 wherein:
the tab includes a second longitudinal axis and a bottom surface that is parallel to the first surface of the first body portion when the tab is inserted into the second aperture;
the distal section includes a first width adjacent to the proximal section and a second width that less than the first width at the distal end of the distal section; and
the first and second widths of the distal section of the latch are parallel to the bottom surface and the second longitudinal axis.

11. The fastener of claim 6 wherein:
the fixed portion of the latch projects from the first surface in a third direction;
the protrusion projects from the tab in the third direction;
the tab flexes in a fourth direction opposite of the third direction when the protrusion engages the second aperture in the retainer; and
the tab flexes in the third direction and the protrusion engages the sixth surface of the retainer after the protrusion is inserted past the second aperture.

12. The fastener of claim 11 wherein the tab on the latch is removable from the second aperture in the retainer by moving the tab in the fourth direction to disengage the protrusion from the sixth surface of the retainer.

13. The fastener of claim 6 wherein:
the retainer includes a rib projecting from the fifth surface of the retainer and disposed about a perimeter of the second aperture; and
an inner surface of the rib engages the tab of the latch when the tab is inserted into the second aperture.

14. The fastener of claim 13 wherein the retainer further includes a gusset connecting the fifth surface and an outer peripheral surface of the rib, the gusset having a ramped surface configured to engage the first aperture in the first component as the retainer is inserted into the first component.

15. The fastener of claim 2 wherein:
the wall of the movable portion of the latch has a wall surface that faces the retainer when the tab of the movable portion is inserted into the second aperture in the second component;
the tab of the movable portion has a tab surface that faces the fixed portion of the latch when the tab is inserted into the second aperture in the second component; and
the movable portion further includes an angle brace connecting the wall surface and the tab surface to one another, the angle brace engaging the retainer as the tab is inserted into the second aperture to prevent the movable portion from moving in the first direction beyond a first position.

16. A fastener for attaching a trim component to an inner structure of a vehicle, the fastener comprising:
a first component configured to be fixed to one of the trim component and the inner structure, the first component including a first body portion and a latch, the first body portion having a first surface, a second surface opposite of the first surface, and a first aperture that extends through the first and second surfaces, the latch including a fixed portion and a movable portion, the fixed portion projecting from the first surface of the first body portion, the movable portion being pivotable relative to the fixed portion about a pivot axis; and
a second component configured to be fixed to the other one of the trim component and the inner structure, the second component including a second body portion and a retainer, the second body portion having a third surface and a fourth surface disposed opposite of the third surface, the retainer projecting from the third surface and defining a second aperture, wherein the retainer is configured to be inserted into the first aperture and, when the retainer is inserted into the first aperture, the movable portion of the latch is configured to be pivoted about the pivot axis in a first direction and inserted into the second aperture in the retainer to secure the trim component to the inner structure, wherein the fixed portion of the latch includes a wall that forms an angle with the first surface, the angle being greater than or equal to 95 degrees and less than or equal to 99 degrees.

17. A fastener for attaching a trim component to an inner structure of a vehicle, the fastener comprising:
a first component configured to be fixed to one of the trim component and the inner structure, the first component including a first body portion and a latch, the first body portion having a first surface, a second surface opposite of the first surface, and a first aperture that extends through the first and second surfaces, the latch including a fixed portion and a movable portion, the fixed portion projecting from the first surface of the first body portion, the movable portion being pivotable relative to the fixed portion about a pivot axis; and
a second component configured to be fixed to the other one of the trim component and the inner structure, the second component including a second body portion and a retainer, the second body portion having a third surface and a fourth surface disposed opposite of the third surface, the retainer projecting from the third surface and defining a second aperture, wherein the retainer is configured to be inserted into the first aperture and, when the retainer is inserted into the first aperture, the movable portion of the latch is configured to be pivoted about the pivot axis in a first direction and inserted into the second aperture in the retainer to secure the trim component to the inner structure, wherein the first component includes a rib projecting from the second surface of the first component and disposed about the first aperture in the first component, the rib engaging the third surface of the second component when the retainer is inserted into the first aperture in the first component.

* * * * *